United States Patent
Drummond et al.

(10) Patent No.: US 6,270,004 B1
(45) Date of Patent: Aug. 7, 2001

(54) TUBULAR COMPOSITE CONTAINERS HAVING UNSUPPORTED FILM LINERS AND METHODS AND APPARATUS FOR MAKING SAME

(75) Inventors: Mike Drummond, Laurinburg, NC (US); Alan Williams, Camden; Ray Adams, Darlington, both of SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/385,900

(22) Filed: Aug. 30, 1999

(51) Int. Cl.⁷ ........................................................ B65D 3/00
(52) U.S. Cl. ............................................ 229/4.5; 229/5.84
(58) Field of Search .................................. 229/4.5, 5.84, 229/93

(56) References Cited

U.S. PATENT DOCUMENTS

| | | |
|---|---|---|
| 2,250,430 | 7/1941 | Wade . |
| 3,002,433 | 10/1961 | Dunlap . |
| 3,228,308 | 1/1966 | Denenberg . |
| 3,315,864 * | 4/1967 | Martin et al. .......................... 229/4.5 |
| 3,400,029 | 9/1968 | Mesrobian et al. . |
| 3,520,463 * | 7/1970 | Ahlemeyer ............................ 229/4.5 |
| 3,524,779 | 8/1970 | Masters et al. . |
| 3,555,976 | 1/1971 | Carter et al. . |
| 3,623,929 | 11/1971 | Wannamaker et al. . |
| 3,716,435 | 2/1973 | Jensen et al. . |
| 4,091,718 | 5/1978 | Thornhill . |
| 4,286,745 * | 9/1981 | Fukuoka ............................... 229/4.5 |
| 4,300,963 | 11/1981 | Berg . |
| 4,917,660 | 4/1990 | Spaller, Jr. et al. . |
| 5,076,440 | 12/1991 | Drummond . |
| 5,084,284 | 1/1992 | McDilda et al. . |
| 5,425,693 | 6/1995 | Gardner et al. . |
| 5,468,207 | 11/1995 | Bower et al. . |
| 5,556,365 | 9/1996 | Drummond et al. . |
| 5,671,895 | 9/1997 | Cederholm et al. . |
| 5,829,669 * | 11/1998 | Drummond et al. ................ 229/5.84 |
| 5,979,748 | 11/1999 | Drummond et al. . |
| 6,076,728 * | 6/2000 | Cahill et al. ........................... 229/4.5 |

FOREIGN PATENT DOCUMENTS

| | | |
|---|---|---|
| 0 857 567 | 8/1998 | (EP) . |
| 0 857 568 | 8/1998 | (EP) . |

\* cited by examiner

Primary Examiner—Gary E. Elkins
(74) Attorney, Agent, or Firm—Alston & Bird LLP

(57) ABSTRACT

A tubular composite container includes a paperboard body ply wrapped into a tubular shape, and a polymer film liner ply wrapped into a tubular shape and adhered to the inner surface of the body ply. The liner ply has a circumferential length when unwrapped and flat that is less than that of the body ply so that the liner ply is substantially uncompressed circumferentially. A strip of polymer film liner material is wrapped onto a mandrel and overlapping edge portions of the liner strip are heat sealed together by first preheating the liner strip to a temperature below the sealing temperature of the heat seal material on the edge portions of the liner strip, and then further heating the overlap region of the liner strip to at least the sealing temperature to cause heat sealing of the edge portions. A paperboard strip is coated on an inner surface with adhesive and is then wrapped about the liner and adhered thereto. The outer surface of the liner strip is surface treated by corona discharge or flame treatment prior to being wrapped on the mandrel to improve adhesion to the paperboard, and the liner strip tension is maintained less than about 1 pound per inch of width to prevent liner stretching as the liner strip is advanced to and wrapped about the mandrel. The preheating of the liner strip is performed by a heated section of the mandrel over which the liner strip passes. The overlap region is locally heated by an infrared heater.

7 Claims, 2 Drawing Sheets

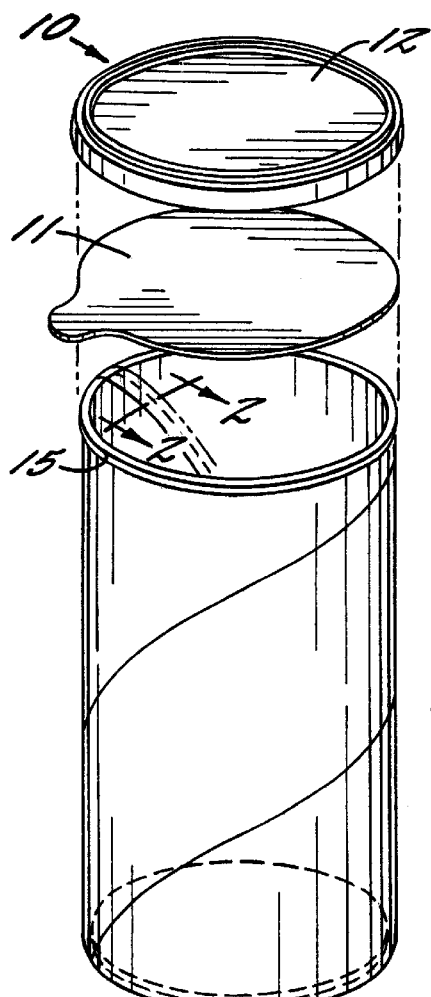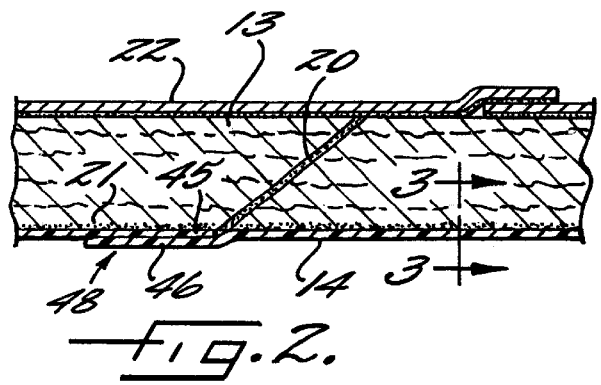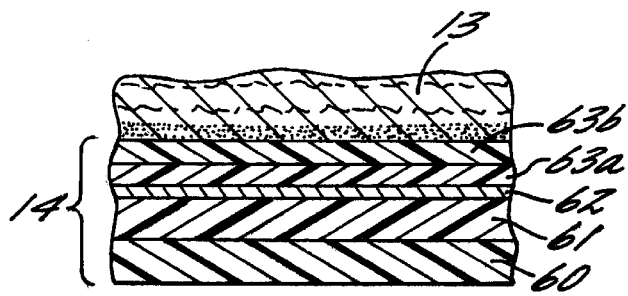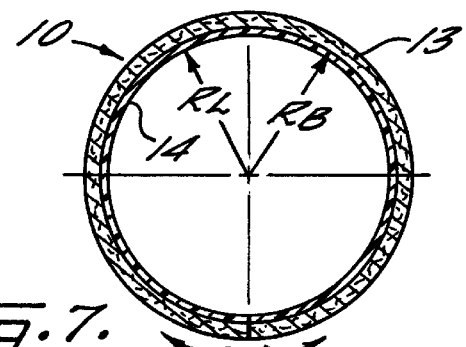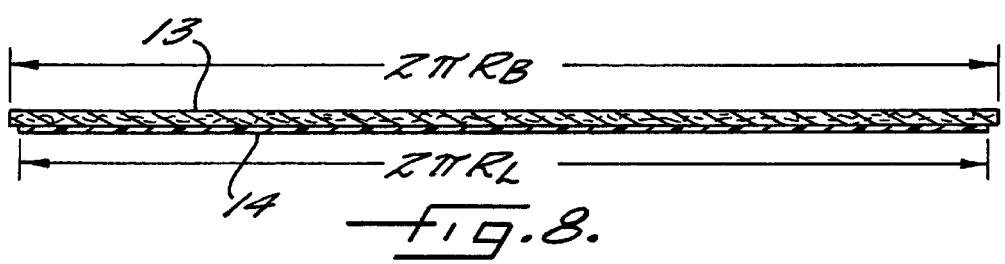

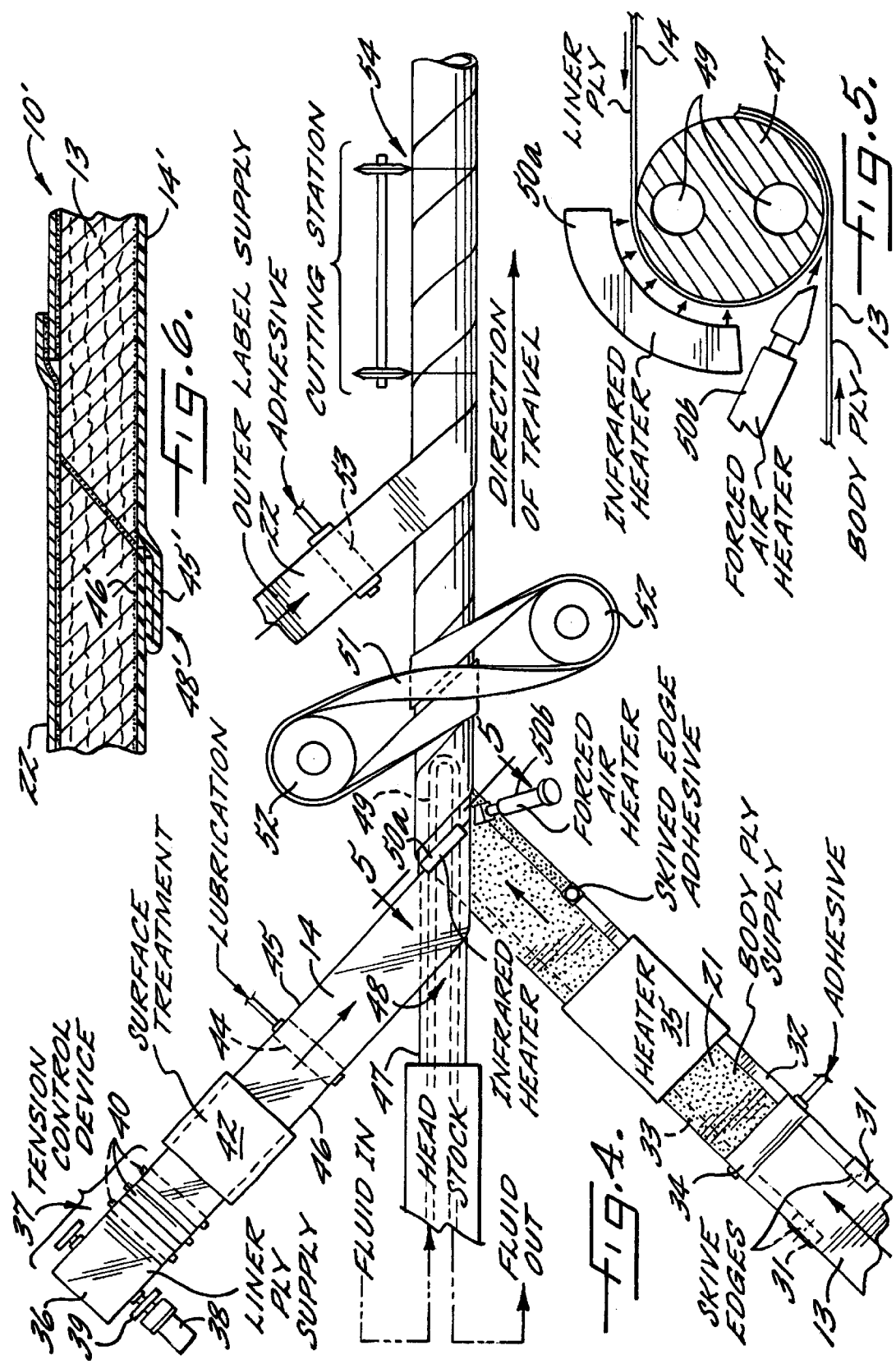

TUBULAR COMPOSITE CONTAINERS HAVING UNSUPPORTED FILM LINERS AND METHODS AND APPARATUS FOR MAKING SAME

FIELD OF THE INVENTION

The present invention relates to methods and apparatus for making tubular composite containers and, more particularly, to methods and apparatus for making such containers by wrapping a liner strip and at least one paperboard strip about an axis and adhering the various strips together.

BACKGROUND OF THE INVENTION

Food and drink products and other perishable items are often packaged in tubular containers that are sealed at both ends. These tubular containers typically include at least one structural body ply and are formed by wrapping a continuous strip of body ply material around a mandrel of a desired shape to create a tubular structure. The body ply strip may be spirally wound around the mandrel or passed through a series of forming elements so as to be wrapped in a convolute shape around the mandrel. At the downstream end of the mandrel, the tube is cut into discrete lengths and is then fitted with end caps to form the container.

Tubular containers of this type typically include a liner ply on the inner surface of the paperboard body ply. The liner ply prevents liquids such as juice from leaking out of the container and also prevents liquids from entering the container and possibly contaminating the food product contained therein. Preferably, the liner ply is also resistant to the passage of gases, so as to prevent odors of the food product in the container from escaping and to prevent atmospheric air from entering the container and spoiling the food product. Thus, the liner ply provides barrier properties and the body ply provides structural properties.

Conventional liner plies most often include aluminum foil, which has good barrier properties and also has advantageous strength properties. In particular, the liner is wound onto the mandrel prior to the winding of the body ply and must be sufficiently strong and stiff to be independently wound on the mandrel without stretching or wrinkling. In addition, the aluminum foil layer typically includes a kraft paper backing for allowing the foil layer to be adhered to the paperboard body ply. Because of the support provided by the kraft-backed foil layer of the liner, such liners are known as "supported" liners.

Aqueous based adhesives (or "wet adhesives") are preferred for adhering the liner ply to the body ply because solvent-based adhesives have become disfavored in light of various environmental concerns over their use and disposal. However, it has heretofore been difficult to get the aqueous adhesives to stick to the smooth and impervious surface of the aluminum foil layer. Accordingly, a kraft paper backing has been preadhered to the foil layer so that the liner can be adhered to the paperboard body ply with wet adhesives. Kraft paper also adds additional cost and thickness to the liner.

Typically, a liner having a foil layer includes a polymeric layer on the surface of the foil that faces inward toward the interior of the resulting container. The polymeric layer prevents product in the container from coming into contact with the foil layer, which in some cases can cause a reaction that can corrode the foil and discolor or otherwise adulterate the product. The polymer layer may also improve the abrasion-resistance of the foil. The polymer layer frequently is also a heat-sealable material permitting one edge portion of the liner strip to be heat sealed to an overlying opposite edge portion of the strip.

In the manufacture of tubular composite containers, a strip of liner material is wrapped about a shaping mandrel and is advanced along the mandrel as the tubular composite container is formed. At the line speeds currently being used in the commercial manufacture of such containers, the liner strip is typically advanced at a linear rate of 400 feet per minute or more and is compressed upon the mandrel by the paperboard strips wrapped on top of the liner and by the belt or other device that advances the tubular container along the mandrel. Consequently, there is considerable friction between the mandrel and the liner, which generates heat. This heat can cause softening of the polymer layer of the liner that is in contact with the mandrel, with the result that the liner tends to adhere to the mandrel and is "scuffed" as it advances along the mandrel.

To help counteract this scuffing tendency, a lubricant is typically applied to the inner surface of the liner. Additionally, in some cases the mandrel is chilled so that the mandrel temperature is kept sufficiently low that the polymer layer of the liner is less prone to softening and sticking to the mandrel. However, where the polymer film layer performs the function of a heat seal layer, a dilemma of sorts is faced wherein a low mandrel temperature is desirable for reducing scuffing and sticking of the liner on the mandrel, while a higher mandrel temperature is desirable for facilitating the activation of the heat-sealable polymer layer to form a seal.

Where a supported liner is used, this dilemma can be largely avoided by heating the liner, or at least the edge portions that are overlapped to form a seal, to a temperature above the sealing temperature for the polymer layer just prior to wrapping the liner about the mandrel. The relatively large mass of the foil and kraft layers of the liner operates as a heat sink which holds the heat long enough that the liner edge portions can be heat sealed to each other when the liner strip is wrapped on the mandrel.

However, foils are expensive, and so it is desired to provide a container and a method of making such as container which includes an "unsupported" liner having the requisite barrier properties without the aluminum foil layer and kraft layer. When an unsupported liner is used, however, the heat sink function of the foil and kraft layers is eliminated. As a consequence, the relatively thin polymer film liner is difficult to heat because of its low mass which tends to dissipate heat rapidly.

The use of unsupported liners also presents other technical challenges. For example, because of the problems associated with winding an unsupported liner on the mandrel, such as stretching, creasing or other misshaping of the liner, it has not been economically or commercially feasible with conventional winding apparatus and methods to manufacture a container having an unsupported liner ply. Nevertheless, in view of the considerable material and cost savings that unsupported liners offer, it would be highly desirable to provide methods and apparatus for making tubular composite containers with unsupported liners.

Unsupported liners also offer advantages in addition to material and cost savings. More particularly, the elimination of the kraft layer enables straight overlap seams to be used in the liner, rather than the conventional "anaconda fold" seams traditionally used with kraft-backed liners. In an anaconda fold, the underlying edge of the liner ply is folded back on itself and adhered to the overlying edge. The anaconda fold allows the polymeric layers on the surface of the foil layer to be heat sealed together. Alternatively, a hot melt adhesive can be used to seal the underlying edge of the liner ply to the overlying edge. The edge of the kraft paper thus is not exposed to the interior of the container and thus liquids in the container will not be absorbed by the kraft paper. An example of such a fold is illustrated in U.S. Pat. No. 5,084,284 to McDilda, et al.

Anaconda folds are undesirable, however, because of their increased thickness. The thickness of an anaconda fold seam is equal to three thicknesses of the liner ply. Thus, with relatively thick supported liners, the anaconda fold presents a substantial thickness and poses difficulties when attempting to hermetically seal the ends of the tubular container. Specifically, the ends of the tube are often rolled outwardly after being cut so as to form a rolled circular bead or flange on one or both ends of the tube and then end caps or membranes are applied and usually sealed to the bead with an adhesive sealant, heat sealing, or other technique. However, in the area where the thick anaconda fold seam forms a portion of the edge surface, the end surface of the bead or flange can be substantially non-planar thus forming hill-like and/or valley-like irregularities. Accordingly, an extra amount of adhesive sealant or heat seal material is required in order to fill the discontinuities and hermetically seal the tubular container. The additional application of adhesive sealant or heat seal material is disadvantageous because of the extra sealant that must be used and the increased difficulty in removing the seal by the consumer due to the additional sealant. For example, where a membrane includes a heat seal layer, the entire heat seal layer must be made thicker, even though the increased thickness is actually needed only around the periphery of the membrane where it contacts the bead.

Because of the problems noted above with respect to supported liners, efforts have been made toward developing methods and apparatus for making tubular composite containers having unsupported liners in which the foil and kraft layers are eliminated from the liner. Additionally, there have been sought methods and apparatus for making composite containers having liners formed without anaconda fold seams.

A liner formed entirely of one or more relatively thin polymer layers would be particularly beneficial in that the additional foil and kraft layers would be eliminated along with their attendant costs, and the liner seam would present a relatively slight bump at the curled end of the container so that problems of hermetically sealing closures on the container ends would be substantially reduced. Accordingly, the assignee of the present application has striven toward developing practicable methods and apparatus for making containers with such unsupported film liners. For example, the assignee of the present application has developed methods and apparatus for making composite containers with unsupported liners made of polymer film and without anaconda folds, as disclosed in commonly owned U.S. patent application Ser. No. 08/796,912 entitled "Polymeric Liner Ply for Tubular Containers and Methods and Apparatus for Manufacturing Same" filed Feb. 6, 1997, and U.S. Pat. No. 5,829,669 entitled "Tubular Container and Methods and Apparatus for Manufacturing Same" issued Nov. 3, 1998, the entire disclosures of which are hereby incorporated herein by reference.

The '912 patent application and '669 patent disclose composite container-forming methods and apparatus wherein, according to one embodiment, a polymeric liner strip is adhesively joined to a paperboard body-forming strip prior to being wrapped about a shaping mandrel. By "prelaminating" the polymeric liner strip and paperboard strip together, the liner is effectively structurally supported by the paperboard strip so that it is relatively easily advanced to the mandrel without becoming excessively stretched or otherwise misshapen in the process. The polymeric liner strip is offset relative to the paperboard to which it is adhesively joined such that a marginal edge portion of the liner strip extends beyond one edge of the paperboard strip. The laminated paperboard/polymeric strip is wrapped about the mandrel so that the edges of the paperboard strip overlap each other and the marginal edge portions of the polymeric liner overlap each other. One of the marginal edge portions of the liner strip includes a non-aqueous adhesive layer that is heat activatable. Before and/or while the laminated paperboard/polymeric strip is wrapped about the mandrel, the non-aqueous adhesive layer on the marginal edge portion is heated to at least its activation temperature, and the overlapping edges are heat sealed together. Thus, the resulting composite container has a polymeric liner formed without anaconda fold seams.

However, the apparatus used to laminate the body and liner plies together before wrapping the plies onto the mandrel may not be the most advantageous in some applications. For instance, in some cases a separate set of nip rollers is needed to effect the lamination. Additionally, it will be appreciated that both the liner supply and body ply supply rolls must be located on the same side of the mandrel, which can make the placement of the supply rolls and the routing of the plies to the mandrel more complicated than would otherwise be the case if both the liner and body plies did not have to approach the mandrel from the same side. Replacement of the rolls may also be more difficult where the two supply rolls are located close together as they would tend to be in order to make efficient use of space.

In light of the foregoing, it would be highly desirable to provide methods and apparatus capable of making a composite container with an unsupported polymer film liner. Furthermore, it would be desirable to provide methods and apparatus permitting the formation of such a container without prelaminating the body and liner plies. It would also be desirable to provide methods and apparatus allowing either same-side or opposite-side winding of the body and liner plies onto the mandrel so as to increase the flexibility available to the designer and user of the apparatus in locating the body and liner supply rolls.

SUMMARY OF THE INVENTION

The above and other objects are met and other advantages are achieved by the present invention, which includes methods and apparatus for making a tubular composite container having a paperboard body strip and an unsupported polymer film liner strip adhered thereto, wherein the unsupported liner strip is wrapped about the mandrel without first being adhered or prelaminated to the paperboard strip.

In accordance with a preferred embodiment of the invention, the liner strip includes a layer of heat-activated sealing material covering at least a first edge portion of the liner strip and a layer of compatible polymer material covering at least an opposite second edge portion of the liner strip. The sealing material has a predetermined sealing temperature at which the material is activated to form a bond with the compatible polymer material. The liner strip is wrapped around the mandrel with the sealing material on the first edge portion of the liner strip facing outward and the compatible polymer material on the second edge portion facing inward toward the mandrel, and the first edge portion is overlapped by the second edge portion to form an overlap joint therebetween having the layer of the sealing material on the first edge portion in contact with the compatible material on the second edge portion. At least the edge portions of the liner strip are preheated at a first heating station such that sealing material reaches an elevated temperature below its predetermined sealing temperature when the edge portions are overlapped to form the overlap joint. Additional heat is then applied locally to the overlap joint of the tubular liner at a second heating station located on the mandrel to further raise the temperature of the sealing material to at least the predetermined sealing temperature and cause the layers of sealing material to bond to the compatible material. Finally, a continuous paperboard body strip is wrapped around the tubular liner on the mandrel and adhered thereto so as to create a tubular container.

In a further preferred embodiment of the invention, preheating of the liner strip is performed by raising the temperature of at least a portion of the mandrel to an elevated temperature and wrapping the liner strip on the mandrel such that the liner strip passes over the elevated-temperature portion of the mandrel prior to reaching the second heating station. In this way, the mandrel temperature can be maintained at a relatively lower temperature than that which would be required were all of the heating for activating the sealing material to be done by heating the mandrel. Thus, scuffing of the liner strip on the mandrel is minimized. The elevated temperature portion of the mandrel can be heated by circulating a heated fluid through the mandrel portion, by disposing resistance-type heating elements within the mandrel portion, or by other means known in the heating art.

In accordance with another preferred embodiment of the invention, the additional heat for activating the sealing material is applied locally to the overlap joint of the liner by heating a portion of the mandrel over which the overlap joint passes to a higher temperature than the elevated-temperature portion of the mandrel. Advantageously, infrared radiation is focused on the overlap joint and penetrates through the liner edge portions such that the mandrel surface underlying the overlap joint is heated to a temperature above the sealing temperature of the sealing material. However, other heating devices can be used in addition to or instead of the infrared radiator, including forced hot air devices directed on the overlap joint, electrical resistance heating elements disposed within the mandrel, or other heating devices known in the heating art.

In order to adhere the liner and paperboard strips together, an adhesive is applied to a surface of the paperboard body strip that confronts the outer surface of the tubular liner. Advantageously, the surface of the liner strip that forms the outer surface of the tubular liner is treated to improve adhesion of the adhesive thereto. The surface treatment in one preferred embodiment comprises corona discharge treatment. Alternatively, flame treatment may be used.

Thin polymer films are stretchable, and accordingly it is preferable to control the tension of the polymer film liner strip to maintain the tension low enough that stretching of the liner strip is substantially avoided. Thus, in a preferred embodiment of the invention, the tension of the liner strip is controlled so that it is less than about 1 pound per inch of width of the liner strip, which permits films having thicknesses of as little as 0.0005 inch to be used for the liner strip.

The invention also encompasses apparatus for making tubular composite containers having unsupported liners. An apparatus according to one preferred embodiment of the invention includes an elongate mandrel having a generally tubular outer surface adapted to permit a polymer film liner strip having a heat-sealing material to be wrapped about and slide over the mandrel. The apparatus also includes a first heater in heat-exchanging relation with a first portion of the mandrel and operable for heating the first portion of the mandrel to an elevated first temperature below a predetermined minimum sealing temperature of the liner heat-sealing material. The apparatus further includes a second heater in heat-exchanging relation with a second portion of the mandrel and operable for heating the second portion of the mandrel to a second temperature above the predetermined minimum sealing temperature. The apparatus also comprises an adhesive applicator for applying adhesive to a surface of a continuous paperboard strip passed through the adhesive applicator. A tube conveyor engages the paperboard strip when it is wrapped about the mandrel and adhered to the liner strip on the mandrel. The tube conveyor advances the composite tube lengthwise along the mandrel as the tube is being formed such that the liner strip is drawn over the first portion of the mandrel and then over the second portion thereof. The first and second heaters at the first and second portions of the mandrel progressively heat at least opposite edge portions of the liner strip to the predetermined minimum sealing temperature for heat-sealing one of the edge portions to the other at an overlap formed therebetween.

Advantageously, the first heater comprises a fluid passage formed within the first portion of the mandrel for circulating a heated fluid therethrough to heat the first portion to the first temperature. The second heater preferably comprises an infrared radiator positioned to direct infrared radiation on an overlap joint of a liner strip on the mandrel. Particularly where a thin unsupported polymer liner is moving over the mandrel at high speeds of up to 400 feet per minute, the liner has very little time to absorb heat. Thus, to heat the liner overlap joint to the seal point, the mandrel is used as a heat sink so as to absorb the infrared radiation. The unsupported polymer liner without foil layer is substantially transparent to infrared radiation, and accordingly the infrared radiation passes through the liner strip overlap joint and heats the surface of the mandrel underlying the overlap joint to the second temperature. The mandrel surface in turn heats the sealing material on the liner to cause the edge portions of the liner to be sealed together. If the polymer film liner were to be heated to the seal point without the use of the mandrel as a heat sink, the film would tend to melt or shrink.

The apparatus preferably also includes a surface treatment unit that modifies the surface of the liner strip to improve wetting and adhesion of adhesive to the liner strip. The surface treatment unit preferably comprises a corona discharge unit. However, other devices can be used instead, such as a flame treatment unit as known in the art.

In a preferred embodiment of the invention, the apparatus also includes a tension control unit for controlling the tension of the liner strip. The tension control unit advantageously is of the type having a web accumulator that accumulates a length of liner strip material from which the liner strip is drawn at substantially constant tension. However, other types of tension control devices known in the art may be used. Preferably, the tension control unit is operable to maintain the tension of the liner strip less than about 1 pound per inch of width of the liner strip as the liner strip is wrapped about the mandrel. Accordingly, even very thin unsupported polymer film liner strips may be used without substantial problems of stretching or other misshaping of the strip.

The invention also encompasses tubular containers having unsupported polymer film liners. In accordance with a preferred embodiment of the invention, a tubular container comprises at least one body ply formed of paperboard and wrapped into a tubular shape having an inner surface, the body ply defining a predetermined circumferential length when in an unwrapped, relaxed, and flat state, and a polymeric liner ply wrapped into a tubular shape and having an outer surface adhered to the inner surface of the body ply, the liner ply defining a predetermined circumferential length when in an unwrapped, relaxed, and flat state. The circumferential length of the liner ply is less than that of the body ply such that the liner ply is substantially uncompressed circumferentially. Accordingly, the liner can be made to lie smoothly against the adjacent body ply so as to present an attractive appearance.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a perspective view of a tubular composite container having an unsupported liner in accordance with a preferred embodiment of the invention;

FIG. 2 is a cross-sectional view taken on line 2—2 of FIG. 1 through the liner overlap joint of the container;

FIG. 3 is a schematic cross-sectional view taken on line 3—3 of FIG. 2, showing the multi-layered construction of the polymer film liner;

FIG. 4 is a schematic view of an apparatus in accordance with one preferred embodiment of the invention for making tubular composite containers with unsupported polymer film liners;

FIG. 5 is a cross-sectional view taken on line 5—5 of FIG. 4, showing in greater detail the infrared heater and forced-air heater positioned adjacent the overlap joint of the polymer film liner for sealing the overlap joint;

FIG. 6 is a cross-sectional view similar to FIG. 2, showing an anaconda fold-type overlap joint in accordance with an alternative preferred embodiment of the invention;

FIG. 7 is a schematic cross-sectional view of a container in accordance with the present invention; and FIG. 8 is a schematic view of the container of FIG. 7 after having been cut lengthwise and unwrapped so that the container wall lies flat.

DETAILED DESCRIPTION OF PREFERRED EMBODIMENTS

The invention is now explained by reference to certain preferred embodiments thereof. It will be understood, however, that the invention is not limited to these embodiments but may take other forms within the scope of the appended claims.

With reference to FIGS. 1 and 2, there is shown a composite container 10 having an unsupported liner in accordance with the present invention. Although illustrated as having a circular cross-section, the tubular container 10 may have any cross-sectional shape that can be formed by wrapping the tube around an appropriately shaped mandrel. For example, the tube can be formed in a rectangular shape with rounded corners. The embodiment illustrated in FIG. 1 is particularly advantageous for packaging potato chips and includes a flexible membrane seal 11 and a reusable plastic end cap 12 over the seal. Various other end closures may be used, however, depending upon the type of food product that is to be packaged. For example, where dough is to be packaged, the end caps are typically constructed of metal and are crimp-sealed onto the ends of the container.

As illustrated in more detail in FIG. 2, the tubular container 10 includes a wall having a body ply 13 that is preferably formed of paperboard and a liner ply 14 that is preferably formed of a polymeric material adhered to the inner surface of the body ply 13. The upper end of the tubular container 10 is rolled over so as to form a bead 15 or flange and the membrane seal 11 is hermetically sealed to the top of the bead with an adhesive sealant (not shown). The end cap 12 is then snapped over the bead 15 and may be reused after the membrane seal 11 has been removed. A metal closure (not illustrated) can be secured to the opposite end of the container 10.

The seams where the various plies are joined together are illustrated in FIG. 2. The paperboard body ply 13 is made of a relatively thick and stiff paperboard. Accordingly, in some types of containers such as self-opening containers, the edges are first skived and then joined together during the tube forming process with an adhesive 20 to create a strong seam. The liner ply 14 is adhered to the inner surface of the body ply 13 with a wet adhesive 21 and the overlapping edges of the liner ply are adhered together to ensure that the container 10 is completely sealed. A label ply 22 is preferably adhered to the outer surface of the body ply 13 having various graphics and/or indicia printed thereon regarding the product within the container.

An apparatus for making tubular containers in accordance with the present invention is illustrated in FIG. 4. A continuous strip of paperboard body ply material 13 is supplied to the apparatus and is first passed through a pair of opposed edge skivers 31. The edge skivers remove part of the square edge of the body ply 13 to create first 32 and second 33 edges having a beveled configuration. In the manufacture of some types of containers where skived edges are not necessary, it will be understood that the edge skivers 31 can be omitted.

The body ply 13 is then advanced through an adhesive applicator 34, which applies an adhesive 21 to the upper surface of the body ply. The adhesive 21 is advantageously an aqueous adhesive that overcomes the many problems associated with solvent based adhesives. No special equipment is needed to capture solvents that evaporate from the adhesive in order to comply with environmental regulations. One preferred adhesive is No. 72-4172, which is available from the National Starch and Chemical Company. Another adhesive that may be used is No. 33-4060, which is also available from the National Starch and Chemical Company.

The body ply 13 and wet adhesive 21 applied thereto are then passed underneath a heater 35 that evaporates at least part of the water content of the aqueous adhesive 21 to render the adhesive substantially tacky. It is important that the correct amount of heat is supplied to the adhesive. Insufficient heat will not evaporate enough water in a sufficiently short period of time with the result that the adhesive will not be rendered sufficiently tacky. Conversely, too much heat will overdry the adhesive and cause the adhesive to lose tackiness. It has been discovered that at least about 100,000 J/m2 is an appropriate amount of heat to render the wet adhesive tacky. More particularly, heating the adhesive with at least about 460,000 J/m2 is preferred. It has been determined that, if the body ply 13 is moving at a speed of about 50 feet per minute (or is heated for less than about 3 seconds), heating the adhesive 21 with a heater 35 having a heat flux of 200,000 W/m2 will raise the temperature of the paperboard body ply 13 to at least the boiling point of water (212° F. at sea level), and as high as 320° F. It will be understood by one of ordinary skill in the art, however, that these parameters may change depending on various factors including the thickness of the adhesive layer, the efficiency of the heat source, the speed of the body ply (line speeds up to about 400 ft./min. are contemplated) and the type of adhesive used. Accordingly, a sufficient amount of heat is that which causes the adhesive to become tacky in a short period of time without being overdried. A preferred type of heat source is an infrared heater although various other heat sources, e.g., forced air heating or the like, can be used.

A preferred liner construction is illustrated in FIG. 3 and includes a seal layer 60, a moisture barrier layer 61 and an adhesive layer 63. The barrier layer 61 is resistant to the passage of liquids and gases such as oxygen. If a barrier is required for both liquids and preferably also gases, a preferred barrier material is polyester. For example, metallized polyethylene teraphthalate (PET) provides a good barrier against the passage of liquids and gases. Some food products, however, do not require a gas barrier, such as various juices, and other barrier materials may be used (although the barrier may also be generally resistant to the passage of gases). It will be understood that various barrier materials or properties could be employed depending upon the item being packaged and on the end use requirements for the container.

Alternative barrier materials include nylon, EVOH (ethylene vinyl alcohol polymer and copolymer), polyvinylidene chloride, polyethylene, and polypropylene and the like as will be apparent to the skilled artisan. One surface of the barrier layer 61 may include a thin metallized coating 62 to provide a metallic appearance and also to enhance the barrier properties. The metallized coating 62, which may be formed of aluminum, is significantly thinner than a foil layer, however, and is not necessary for strength or barrier properties in certain applications. The barrier may include a silicon dioxide coating. Thus, a thick and expensive foil sheet layer is advantageously eliminated. The liner ply 14 preferably has a total thickness less than about 3 mils and is more preferably closer to 1 mil or less in thickness.

The adhesive layer 63, described in more detail below, comprises a material that is activated to bond to itself or to other compatible materials when raised to a predetermined sealing temperature of the material. The heat seal layer 60 comprises such a compatible material that will readily adhere to the adhesive layer 63 when the adhesive layer is raised to its sealing temperature.

With reference again to FIG. 4, the liner 14 is advanced from a liner supply roll 36 through a tension control device 37 on its way to being wrapped about the mandrel 47. Various types of devices may be used for controlling the liner tension. As shown, the tension control device 37 includes a motor 38 and a brake 39 for respectively assisting and resisting rotation of the liner supply roll 36, and a web accumulator comprising a plurality of rollers 40 spaced apart vertically such that the liner 14 is wound in serpentine fashion around the rollers 40. At least one of the rollers 40 is vertically movable relative to the other rollers 40 such that the length of the web accumulated in the web accumulator can be varied. A sensor (not shown) senses the length of web accumulated in the accumulator, and based on the signal from the sensor the motor 38 is operated or the brake 39 is applied to maintain the length of accumulated web within predetermined limits. However, regardless of the specific device chosen for controlling liner tension, advantageously the tension control device 37 is capable of maintaining the liner tension less than about 1 pound per inch of width of the liner 14, and more preferably less than about 0.5 pound per inch of width. For instance, for a liner 14 having a width of 7 inches, the tension control device 37 preferably should maintain the liner tension at about 1–3 pounds depending on the thickness of the film, thinner films requiring a lower tension value.

After the tension control device 37, the liner 14 passes through a surface treatment unit 42 that treats the outer surface of the liner 14 (i.e., the surface that will face outward away from the mandrel 47 and be adhered to the paperboard body strip 13) to improve wetting and adhesion of adhesive thereto. The surface treatment unit in a preferred embodiment of the invention comprises a corona discharge unit. However, other devices such as flame treatment devices may be used instead. After passing through the surface treatment unit 42, the liner 14 passes through an optional lubrication device 44, which applies a lubricant to the inner surface of the liner 14 (i.e., the surface that contacts the mandrel 47), except for the edge portion to be heat sealed, for aiding in movement of the liner 14 along the mandrel 47. In some applications, the lubricant may not be needed and thus the lubrication device 44 can be omitted. For example, where the liner 14 has an inner surface formed of a material with a melting temperature substantially higher than the mandrel temperature, scuffing of the liner on the mandrel may not be a significant problem and hence the lubricant may not be required.

After passing through the lubricating device 44, the liner 14 is helically wrapped about the mandrel 47 such that one marginal edge portion 45 of the liner 14 overlaps an opposite marginal edge portion 46 of a previously wrapped helical turn of the liner 14 to form an overlap joint 48 (FIG. 2) therebetween. The overlap joint 48 is sealed by heating the liner 14 to raise the temperature of the liner 14 to at least the sealing temperature of the adhesive layer 63 that defines the outer surface of the liner 14. The adhesive layer 63 includes a non-aqueous polymeric adhesive that is activated at a predetermined sealing temperature. Such adhesives, which are also known as "dry-bond" adhesives, can include one or more of the following polymers or modified copolymers thereof: ethylene vinyl acetate, ethylene acrylic acid, methylene acrylic acid, ethyl methyl acrylate, metallocenes, and blends with each other or lower cost polyolefins. A preferred embodiment is illustrated in FIG. 3 and includes an adhesive layer 63 having two sublayers 63a, b that are coextruded together. The inner sublayer 63a is preferably methylene acrylic acid, which adheres well to the polyester barrier layer 61, and the outer sublayer 63b is preferably ethyl methyl acrylate, which adheres well to the paperboard body ply 13. The adhesive layer 63 is manufactured as part of the liner ply.

A seal layer 60 may also form a part of the liner ply 14 and defines the inner surface of the liner ply. The seal layer 60 provides a surface against which the adhesive layer 63 is adhered when the first marginal edge portion 45 of the liner ply 14 is brought into an overlapping relationship with the second marginal edge portion 46. The seal layer 60 includes a polyolefin polymer, which is preferably high-density polyethylene or a mixture of high-density and low-density polyethylene.

One advantageous feature of the seal layer 60 is that it has a higher melting temperature than the adhesive layer 63. As noted above, the first marginal portion 45 of the liner ply 14 is raised to a temperature such that the adhesive layer 63 is activated. However, if the seal layer 60 was made of the same polymer as the adhesive layer 63 or had a melting temperature equal to or less than the sealing temperature of the adhesive layer 63, the seal layer 60 would be melted and inclined to stick to the mandrel 47, which would greatly impede the winding process. The present invention does not suffer from this problem, however, because the seal layer 60 has a melting temperature higher than the sealing temperature of the adhesive layer 63.

An important aspect of the present invention is the method by which the overlapping edge portions 45 and 46 of the liner 14 are heated to activate the adhesive layer 63 and form the sealed overlap joint 48. Because the liner 14 is very thin, it has very little capacity to retain heat. Accordingly, heating the liner 14 prior to the liner 14 being wrapped onto the mandrel 47 would be inefficient and difficult to accomplish in view of the rapid cooling that would take place subsequent to the heating device and prior to the liner being wrapped about the mandrel. Accordingly, the heating of the liner 14 in accordance with a preferred embodiment of the present invention is performed in a two-stage process while the liner 14 is on the mandrel 47 such that the mandrel acts as a heat sink for efficiently heating the liner overlap joint. More particularly, a portion 48 of the mandrel has a fluid passage 49 through which a heated fluid is circulated to elevate the temperature of the portion 48 to below the sealing temperature of the adhesive layer 63 of the liner. For instance, where the sealing temperature of the adhesive layer 63 is about 180–220 degrees F, the heated portion 48 of the mandrel is heated to about 130–170 degrees F (i.e., about 50 degrees F below the sealing temperature of the adhesive layer). The liner 14 passes over the heated mandrel portion 48 as it is wrapped about the mandrel and thus is pre-heated to a temperature essentially equal to that of the mandrel portion 48. The overlapping edge portions 45 and 46 of the liner 14 are then further heated to at least the sealing temperature of the adhesive layer 63 by a pair of local heaters, specifically an infrared heater 50a and a forced-air heater 50b, which direct heat locally at the overlap joint 48 of the liner. With additional reference to FIG. 5, the infrared heater 50a directs infrared radiation at the overlap joint 48. The infrared radiation penetrates through the overlapping edge portions 45 and 46 of the liner and locally heats a portion of the mandrel 47 underlying the edge portions 45, 46 to a temperature at least as great as, and preferably somewhat higher than, the sealing temperature of the adhesive layer 63. The infrared heater 50a and/or the forced-air heater 50b may be elongated in the helical direction. As an alternative to the use of infrared or forced-air heating, a laser may be used to locally heat the overlap joint to seal the liner edge portions together.

After the liner edges have been sealed together to form a polymer film tube on the mandrel 47, the paperboard strip 13 (or multiple plies of paperboard in the case of a multi-ply body wall) is wrapped onto the liner 14 and adhered thereto by the adhesive 21 on the paperboard strip 13. The tube is then advanced down the mandrel 47 by a tube conveyor such as winding belt 51 wrapped around a pair of opposed pulleys 52. The winding belt 51 not only rotates and advances the tube, but also applies pressure to the overlapping edges of the body ply 13 and liner ply 14 to ensure a secure bond between the respective ply edges.

An outer label ply 22 is then preferably passed over an adhesive applicator 53 and wrapped around the body ply 13. The label ply 22 could be applied before the winding belt 51. At a cutting station 54, the continuous tube is cut into discrete lengths and removed from the mandrel 47.

An advantageous characteristic of a container such as the container 10 formed in accordance with the present invention is that, by virtue of wrapping the liner 14 onto the mandrel without first laminating it to the body ply 13, the liner 14 can be made to be relaxed (i.e., not in substantial circumferential tension or compression) and to lie flat against the adjacent body ply 13. This characteristic is explained by reference to FIGS. 7 and 8, which schematically depict a container 10 in sectioned end view with the thickness of the liner 14 shown disproportionately large relative to that of the body ply 13 for clarity. FIG. 7 depicts the container 10 in its normal state. In FIG. 8, the container 10 has been cut lengthwise at one circumferential location and has been unwrapped so that the container side wall is lying flat. It will be noted in FIG. 7 that the inner radius RL of the liner 14 is unavoidably smaller than the inner radius RB of the body ply 13, and specifically is smaller by the thickness of the liner 14 plus the thickness of the adhesive (not shown in FIGS. 7 and 8, but see reference numeral 21 in FIG. 2) that adheres the liner to the body ply. Consequently, the liner 14 of necessity must have a circumferential length $2\pi RL$ that is less than the circumferential length $2\pi RB$ of the body ply 13. The same must be true of any container having a liner adhered to the inner surface of a body ply. However, in the container 10 made in accordance with the present invention, the circumferential length of the liner 14 is still less than that of the body ply 13 even when the container is cut and unwrapped and the liner 14 and body ply 13 are relaxed as shown in FIG. 8. To achieve the state of the plies shown in FIG. 8, it must be assumed that the liner 14 is not adhered to the body ply 13 and thus is free to slide relative to the body ply 13 when the container is unwrapped. The method of the present invention essentially represents a reversal of the unwrapping operation just described. That is, the liner 14 is first wrapped about the mandrel and is in a state generally free of circumferential compression (and in fact is under slight tension as controlled by the tension control device 37), and then the body ply 13 carrying adhesive on its inner surface is wrapped about the mandrel over the liner so that it is in a state generally free of circumferential compression (and in fact is also under tension caused by friction of the various rollers and devices through which the body ply passes on its way to the mandrel). Because the liner 14 and body ply 13 are separately wrapped onto the mandrel rather than being prelaminated in a flat condition and then wrapped about the mandrel, the liner and body ply are able to undergo relative movement so that the liner can lie flat against the body ply in an uncompressed state. In contrast, when the body ply and liner are prelaminated and then wrapped, unless subsequent relative movement between the liner and body ply takes place, the liner of necessity must become foreshortened in the circumferential direction because the liner and body ply start out the same length in the flat state. Accordingly, such prelamination methods can sometimes lead to liners that do not lie flat and smooth against the body ply. The present invention, however, enables the liner to lie flat and smooth against the body ply in a state substantially free of circumferential compression.

Once the containers 10 have been formed, the ends of the containers 10 are rolled outwardly to form the bead 15 or a flange. Another advantageous feature of the polymeric liner ply according to the present invention is that the elasticity of the polymer causes the bead 15 to be locked in place once rolled. Conventional inelastic foil liners may have a tendency to unroll the bead 15 or crack, which can present a problem when sealing the ends.

After being filled with the food product, a membrane seal 11 preferably is sealed on one or both ends of the container 10. An end cap 12 can then be placed over the seal 11. The unsupported liner ply 14 according to the present invention is significantly thinner than conventional foil liners and a straight lap seam can be used instead of an anaconda fold seam. Accordingly, much smaller discontinuities are presented at the point where the seam crosses the bead. Thus, the membrane seal 11 can be cheaply and easily sealed to the bead 15 with a minimum amount of sealant, and the fit and removability of the cap can be improved.

The invention is not limited to containers in which the liner has a straight overlap seam, but also applies to containers in which the liner has a fold seam similar to an anaconda fold. FIG. 6 depicts a cross-section taken through the overlap area of an alternative preferred embodiment of a container 10' in accordance with the invention, in which a folded marginal edge portion 45' of the liner 14' is overlapped by an opposite marginal edge portion 46' of the liner and sealed thereto. It will be appreciated that the inner surface of the marginal edge portion 46' is thus in contact with the inner surface of the folded part of the other marginal edge portion 45'. Accordingly, if the liner 14' is constructed with a seal layer forming the inner surface of the liner 14' similar to the seal layer 60 of the liner 14 of FIG. 3, the overlap joint 48' is sealed by raising the temperature of the liner in the overlap region to at least the sealing temperature of the seal layer. The heat seal layer may be applied to only the inner surfaces of the marginal edge portions 45' and 46' and not to the remainder of the inner surface of the liner 14' in order to minimize liner scuffing problems that would otherwise be encountered when the heat seal layer is raised to its sealing temperature. Such marginal heat seal layers could be formed by coextrusion of the liner material or with mounted blown films. Alternatively, a heat-activatable adhesive, similar to the adhesive layer 63 of the liner 14, could be applied to the inner surface of the folded part of the edge 45' while not being applied to the remainder of the inner surface of the liner 14'.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the tubular containers according to the present invention are not necessarily helically wound but may instead be longitudinally wrapped to create a "convolute" tube having an axially extending seam. In addition, although the tubular containers according to the present invention have been described primarily in connection with food products, it is to be understood that the containers could be used in connection with other products where the liner ply is advantageous such as, for example, ink or caulk. Although specific terms are employed herein, they are used in a generic and descriptive sense only and not for purposes of limitation.

What is claimed is:

1. A multi-ply tubular container comprising:
   at least one body ply formed of paperboard and wrapped into a tubular shape having an inner surface, the body ply defining a predetermined circumferential length when in an unwrapped and flat state; and
   a polymeric liner ply wrapped into a tubular shape and having an outer surface adhered to the inner surface of the body ply, the liner ply defining a predetermined circumferential length when in an unwrapped and flat state;
   the circumferential length of the liner ply being less than that of the body ply such that the liner ply is substantially uncompressed circumferentially.

2. The container of claim 1, wherein the liner ply includes overlapping first and second edge portions, the first edge portion having an outer surface facing the body ply, and the second edge portion having an inner surface facing away from the body ply, and wherein the inner surface of the second edge portion is heat sealed to the outer surface of the first edge portion.

3. The container of claim 2, wherein the liner ply comprises a polymer barrier film layer that is substantially impervious to moisture and gases and has outer and inner surfaces facing toward and away from the body ply, respectively, a layer of heat-sealable material covering at least the first edge portion of the outer surface of the barrier film layer, and a layer of a compatible polymer material to which the heat-sealable material will adhere covering at least the second edge portion of the inner surface of the barrier film layer and heat sealed to the layer of heat-sealable material on the first edge portion.

4. The container of claim 3, wherein the barrier film layer comprises metallized polyester.

5. The container of claim 3, wherein the layer of heat-sealable material covers substantially the entire outer surface of the barrier film layer.

6. The container of claim 3, wherein the compatible polymer material contains high-density polyethylene.

7. The container of claim 3, wherein the liner ply has a thickness of less than about 3 mils.

\* \* \* \* \*